United States Patent [19]

Matsumoto

[11] Patent Number: 5,532,779
[45] Date of Patent: Jul. 2, 1996

[54] PHOTOGRAPHIC PROCESSOR

[75] Inventor: Nobuo Matsumoto, Kanagawa, Japan

[73] Assignee: Fuji Photo Film Co., Ltd., Kanagawa, Japan

[21] Appl. No.: 318,342

[22] Filed: Oct. 5, 1994

[30] Foreign Application Priority Data

Nov. 1, 1993 [JP] Japan ................................ 5-273663

[51] Int. Cl.$^6$ ................................................ G03D 3/08
[52] U.S. Cl. ........................ 354/319; 354/321; 354/322
[58] Field of Search ........................ 354/298, 319–323, 354/336; 355/55, 56, 72, 76, 27–29, 233–235, 100, 106; 134/64 P, 64 R, 122 P, 122 R; 430/30, 398–400

[56] References Cited

U.S. PATENT DOCUMENTS

| | | | |
|---|---|---|---|
| 3,462,221 | 8/1969 | Tajima et al. | 355/27 |
| 4,185,912 | 1/1980 | Schwartz | 355/28 |
| 4,837,602 | 6/1989 | Tahara | 355/29 |
| 4,864,354 | 9/1989 | Crasnianski | 354/322 X |
| 4,959,684 | 9/1990 | Ito | 355/55 |
| 5,274,419 | 12/1993 | Miyasaka et al. | 355/56 X |
| 5,307,114 | 4/1994 | Nitsch et al. | 355/29 |

*Primary Examiner*—D. Rutledge
*Attorney, Agent, or Firm*—Sughrue, Mion, Zinn, Macpeak & Seas

[57] ABSTRACT

A photographic processor includes a first transporting device, a second transporting device, and an exposing optical system. The first transporting device is provided in an exposure device and transports a photographic film subjected to development processing by the first processor at a predetermined speed. The second transporting device is provided in the exposure device and transports an unexposed photosensitive material at a predetermined speed. The exposing optical system is provided in the exposure device and effects exposure by causing an image on the photographic film to be formed on the photosensitive material in a case where the photographic film is being transported by the first transporting device and the photosensitive material is being transported by the second transporting device. In this photographic processor, since imagewise exposure is effected while both the photographic film and the photosensitive material are being transported by the exposure device at predetermined speeds, respectively, the photosensitive material can be exposed in accordance with the image recorded on the photographic film by arbitrarily changing the magnification with a simple arrangement.

12 Claims, 5 Drawing Sheets

PHOTOGRAPHIC PROCESSOR

BACKGROUND OF THE INVENTION

1. Field of the Invention

The present invention relates to a photographic processor which integrates the process of developing a photographic film, the process of printing an image recorded on the photographic film onto a photographic printing paper and the process of developing the photographic printing paper with the image printed thereon.

2. Description of the Related Art

A so-called large lab which handles negative films in large volumes and a so-called mini lab which handles negative films in small volumes are known as apparatuses in which a photographed photographic film (e.g., negative film) is supplied from a film supplying apparatus to a processing apparatus to be subjected to various processing including development, fixing, washing, and drying, and the image recorded on the negative film is then printed onto a photographic printing paper by a printer.

The mini lab includes a small-size apparatus for developing negative films in small volumes, and a small-size apparatus in which an image recorded on the negative film is printed on a photographic printing paper and the photographic printing paper is then subjected to processing. These apparatuses are formed into an integral, compact, easily-operated apparatus within the mini lab.

There has been a growing number of customers who enjoy changing the photographing size to such as an H size and a panoramic size. To meet this demand, some cameras are provided with the function of photographing in various image sizes, including the standard size, the H size, and the panoramic size. These cameras make it possible to effect standard photographing on the same negative film and record images of the H size and the panoramic size whose aspect ratios differ from the aspect ratio of the standard size for standard photographing.

Figure 6A:
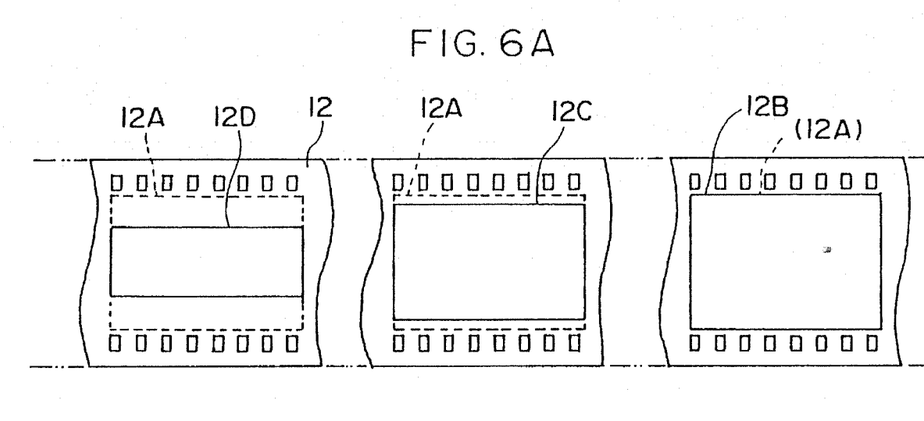
FIG. 6A is a schematic diagram illustrating an example of a negative film with images recorded thereon.

As shown in FIG. 6A, when images of such different sizes are recorded on a negative film 12, images are recorded by changing the aspect ratio within a standard image frame area 12A. For this reason, an H-size image 12C and a panoramic-size image 12D are recorded in sizes smaller than the size of a standard-size image 12B. Namely, the standard-size image 12B is recorded by making maximum use of the image frame area 12A, whereas the dimensions of the H-size image 12C and the panoramic-sze image 12D in the transverse direction of the negative film 12 are respectively smaller in proportion to their aspect ratios although their dimensions in the longitudinal direction of the negative film 12 are the same as that of the image 12B of the standard size.

Figure 6B:
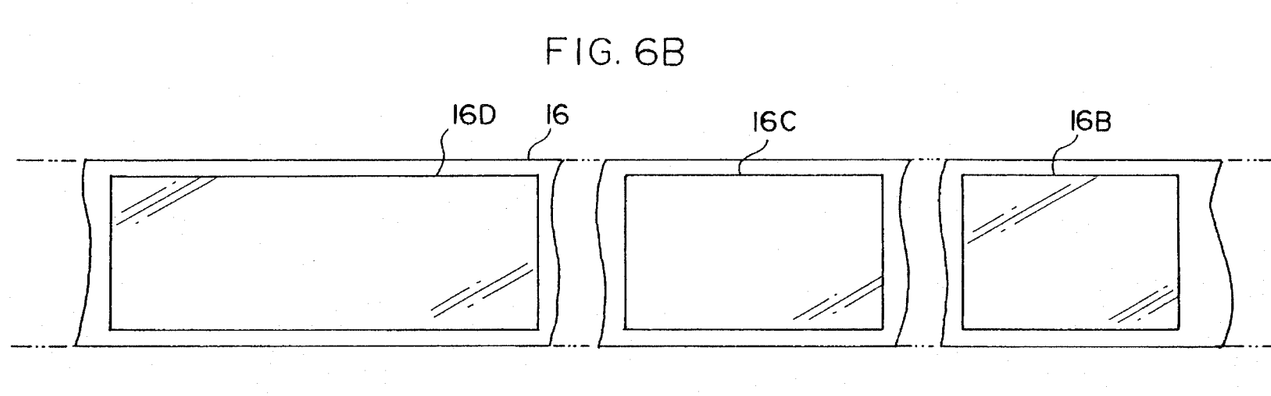
FIG. 6B is a schematic diagram illustrating a photographic printing paper on which images recorded on the negative film have been exposed.

The images which are recorded on the negative film with their sizes changed in accordance with their aspect ratios are recorded on a photographic printing paper 16 having a fixed transverse dimension. As shown in FIG. 6B, as compared with a standard-size image 16B recorded on the photographic printing paper 16, an H-size image 16C and a panoramic-size image 16D have the same transverse dimension as viewed in the transverse direction of the photographic printing paper 16, but their dimension in the longitudinal direction of the photographic printing paper 16 are respectively longer.

Namely, the H-size image 12C and the panoramic-size image 12D recorded on the negative film 12 are exposed on the photographic printing paper 16 with greater magnifications than the standard-size image 12B.

However, in the former type of mini labs which is made compact by being formed separately as a film processor and a photographic printing paper processor, if an attempt is made to print an image recorded on the negative film by changing the magnification, there arises the need to secure a large space for an exposure section, and a complicated mechanism for allowing changes in the magnification must be provided, which leads to higher cost of the apparatus.

SUMMARY OF THE INVENTION

Accordingly, in view of the above-described problems, it is an object of the present invention to provide a photographic processor having an exposure device which facilitates changes in the magnification without making the processor large in size and resulting in higher cost.

In accordance with a first aspect of the present invention, there is provided a photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected exposure processing, to development processing while transporting the photosensitive material are accommodated integrally, the photographic processor comprising: a first transporting device provided in the exposure device and adapted to transport the photographic film subjected to development processing by the first processor at a predetermined speed; a second transporting device provided in the exposure device and adapted to transport an unexposed photosensitive material at a predetermined speed; and an exposing optical system provided in the exposure device and adapted to effect exposure by causing the image on the photographic film to be formed on the photosensitive material in a case where the photographic film is being transported by the first transporting device and the photosensitive material is being transported by the second transporting device.

In a second aspect of the present invention, in the photographic processor according to the first aspect of the invention, the first transporting device is set in such a manner as to be capable of varying the transporting speed of the photographic film on the basis of a magnification of the image on the photosensitive material with respect to the image on the photographic film. Further, the transporting speed of the photographic film transported by the first transporting device is set such that if the transporting speed of the photosensitive material transported by the second transporting device is fixed, a transporting speed $V_{ND}$ of the photographic film in the first processor and a maximum transporting speed $V_{NEmax}$ of the photographic film transported by the first transporting device satisfy the following formula: $V_{ND} \leq V_{NEmax}$. In addition, the exposing optical system is provided in such a manner as to be capable of varying illuminance on the basis of a magnification.

In a third aspect of the present invention, in the photographic processor according to the first aspect of the invention, the second transporting device is set in such a manner as to be capable of varying the transporting speed of the photosensitive material on the basis of a magnification of the image on the photosensitive material with respect to the image on the photographic film. Further, the transporting speed of the photosensitive material transported by the second transporting device is set such that if the transporting speed of the photographic film transported by the first transporting device is fixed, a transporting speed $V_{PD}$ of the photosensitive material in the second processor and a maximum transporting speed $V_{PEmax}$ of the photosensitive material transported by the second transporting device satisfy the following formula: $V_{PD} \leq V_{PEmax}$. In addition, the exposing optical system is provided in such a manner as to be capable of varying illuminance on the basis of the magnification.

In a fourth aspect of the present invention, in the photographic processor according to the first aspect of the invention, the first transporting device, the second transporting device, and the exposing optical system set the transporting speed of the photographic film transported by the first transporting device, the transporting speed of the photosensitive material transported by the second transporting device, and illuminance by the exposing optical system on the basis of a magnification mi of the image on the photosensitive material with respect to the image on the photographic film.

In accordance with a fifth aspect of the present invention, in the photographic processor according to the fourth aspect of the invention, the first transporting device and the second transporting device are set such that the magnification mi at which the transporting speed of the photographic film transported by the first transporting device and the transporting speed of the photosensitive material transported by the second transporting device are changed over satisfies the following formula: $m_i = (m_{(i-1)} \times m_{(i+1)})^{1/2}$ In accordance with a sixth aspect of the present invention, in the photographic processor according to the first aspect of the invention, the first transporting device is set in such a manner as to be capable of varying the transporting speed of the photographic film in inverse proportion to the cubic of a magnification of the image on the photosensitive material with respect to the image on the photographic film.

In accordance with a seventh aspect of the present invention, in the photographic processor according to the third aspect of the invention, the second transporting device is set in such a manner as to be capable of varying the transporting speed of the photosensitive material in inverse proportion to the square of a magnification of the image on the photosensitive material with respect to the image on the photographic film.

In accordance with the first aspect of the present invention, in the exposure device for printing images recorded on a photographic film onto a photosensitive material such as a photographic printing paper, both the photographic film and the photosensitive material are moved. As an example of such an exposing method, so-called slit exposure is known. This slit exposure makes it possible to make the exposing mechanism relatively compact and facilitate changes in the magnification with a simple arrangement.

By adopting this slit exposure, it is possible to expose the images recorded on the photographic film onto the photosensitive material such as the photographic printing paper by changing the magnification for exposure in accordance with the sizes of the various images recorded on the photographic film, such as the H size, the panoramic size, and the standard size without making the apparatus large.

In accordance with the second aspect of the present invention, an arrangement is provided such that the maximum transporting speed $V_{NEmax}$ of the photographic film during exposure by the exposing device is set to be equal to or faster than the transporting speed $V_{ND}$ of the photographic film in the first processor.

In the first and second processors, in order to provide uniform processing for the photographic film, it is preferable to set the respective transporting speeds fixed, respectively. For this purpose, the average transporting speed of the photographic film in the exposure device is preferably slower than the transporting speed $V_{ND}$. However, if the transporting speed of the photographic film in the exposure device is merely made slower, the photographic films become accumulated between the first processor and the second processor, so that a waste in time occurs in effecting speedy processing.

Accordingly, by providing a setting such that $V_{ND} \leq V_{NEmax}$, it is possible to prevent the photographic films being wastefully accumulated between the first processor and the second processor, thereby making it possible to effect speedier processing. Incidentally, when the transporting speed of the photosensitive material during exposure is fixed, if the magnification becomes larger, the transporting speed of the photographic film during exposure becomes slower, whereas if the magnification becomes smaller, the transporting speed of the photographic film becomes faster. At this time, it suffices if the brightness of the light source in the exposing optical system is adjusted such that the illuminance on the photosensitive material becomes fixed.

In accordance with the third aspect of the present invention, the maximum transporting speed $V_{PEmax}$ of the photosensitive material during exposure is equal to or faster than the transporting speed $V_{PD}$ of the photosensitive material in the second processor.

The average speed of the photosensitive material in the exposure device needs to be made faster, even slightly, than the transporting speed of the photosensitive material in the second processor. However, if the transporting speed of the photosensitive material in the exposure device is made faster, the photosensitive materials become accumulated between the exposure device and the second processor, so that a large accumulating space is required.

The arrangement provided is such that the transporting speed of the photosensitive material in the exposure device when the magnification is made maximum without changing the transporting speed of the photographic film (i.e., the maximum transporting speed $V_{PEmax}$) is greater than or equal to the transporting speed in the second processor. Accordingly, the average transporting speed of the photosensitive material in the exposure device can be made faster than the transporting speed of the photosensitive material in the second processor. Hence, it is possible to prevent the accumulation of the photosensitive materials between the exposure device and the second processor, thereby making it possible to effect speedy processing. At this time, it suffices if the brightness of the light source in the exposing optical system is adjusted such that the illuminance on the photosensitive material becomes fixed.

In accordance with the fourth aspect of the present invention, the transporting speed of the photographic film transported by the first transporting device, the transporting speed of the photosensitive material transported by the second transporting device, and illuminance by the exposing optical system in the exposure device are set in advance in accordance with the magnification for exposure. Consequently, if the size, including such as the standard size, the H size, and the panoramic size, can be determined, the change in magnification can be effected very easily and accurately.

In accordance with the fifth aspect of the present invention, a boundary of the magnification $m_i$ for changing over the transporting speed of the photosensitive material is set. When exposure is effected, it is necessary to secure the brightness of the light source of the exposing optical system so that illuminance on the surface of the photosensitive material becomes optimal. However, if the variable range of the brightness of the light source is limited, it is impossible to expose the photosensitive material in an optimal state.

For this reason, by providing boundaries for changing over the predetermined transporting speeds of the photosensitive material, it is possible to carry out optimal exposure suited to respective magnifications in the variable range of the brightness of the light source.

In accordance with the sixth and seventh aspects of the present invention, the transporting speed VNE of the photographic film transported by the first transporting device and the transporting speed $V_{PE}$ of the photosensitive material transported by the second transporting device are set with respect to the magnification $m_i$, so that the illuminance on the photosensitive material being transported and the illuminance on the photographic film will not be changed.

The illuminance provided by the light source of the exposing optical system having the same brightness changes with the transporting speed. However, by setting the transporting speeds $V_{NE}$ and $V_{PE}$ in the above-described manner, it is possible to expose the photosensitive material in accordance with the images recorded on the photographic film in an optimal state by suppressing the change of illuminance on the photographic film and the photosensitive material.

As described above, in the photographic processor in accordance with the present invention, since imagewise exposure is effected while both the photographic film and the photosensitive material are being transported at predetermined speeds, respectively, in the exposure device, it is possible to expose the photosensitive material in accordance with the images recorded on the photographic film by arbitrarily changing the magnification with a simple arrangement.

In addition, in the present invention, since the transporting speed of the photographic film and the transporting speed of the photosensitive material during imagewise exposure are set in accordance with the magnification so as to optimally maintain the illuminance on the photosensitive material, an outstanding advantage is obtained in that optimal images can be recorded on the photosensitive material even if exposure is effected while both the photographic film and the photosensitive material are being moved.

The above and other objects, features and advantages of the present invention will become more apparent from the following detailed description of the invention when read in conjunction with the accompanying drawings.

DESCRIPTION OF THE PREFERRED EMBODIMENT

Figure 1:
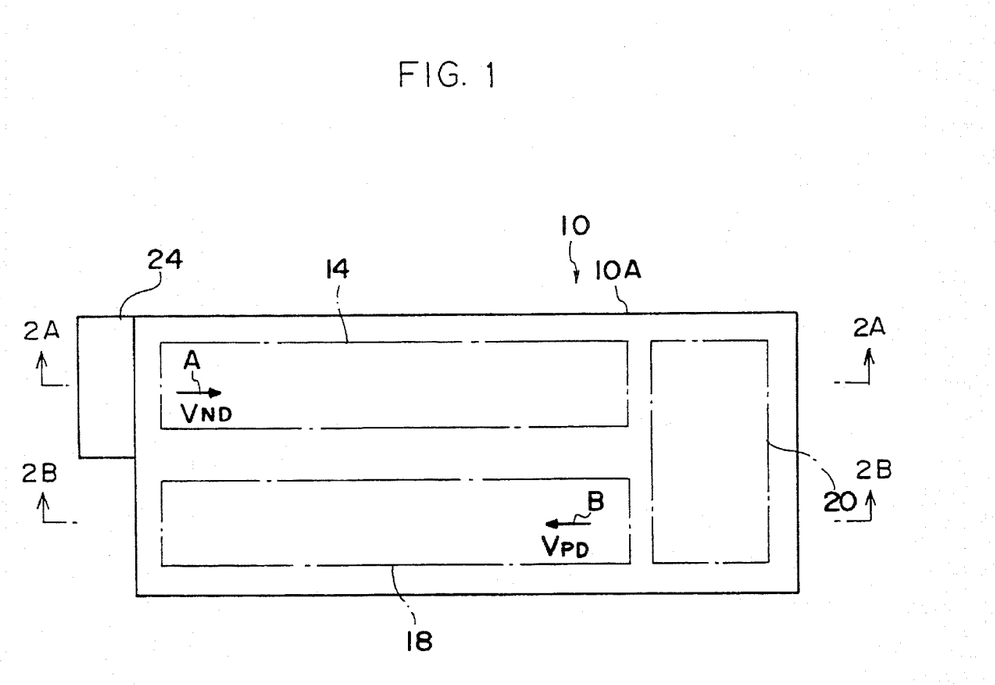
FIG. 1 is plan view schematically illustrating a schematic arrangement of a photographic processor used in an embodiment of the present invention.
Figure 2A:
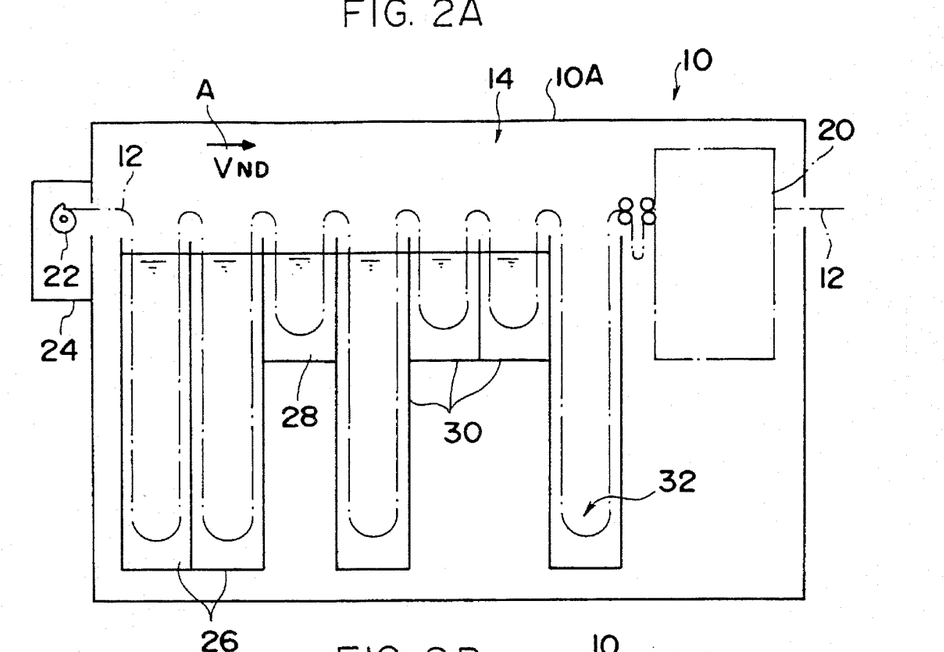
FIG. 2A is a side elevational view illustrating a schematic arrangement of a film processor as viewed along line 2A—2A in FIG. 1.
Figure 2B:
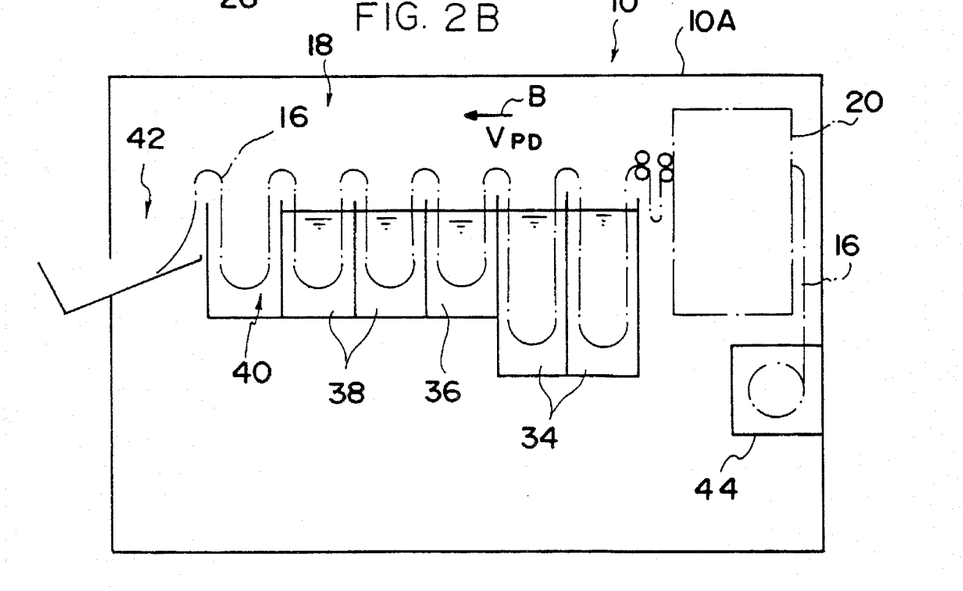
FIG. 2B is a side elevational view illustrating a schematic arrangement of the film processor as viewed along line 2B—2B in FIG. 1.

FIGS. 1, 2A, and 2B show a schematic arrangement of a photographic processor 10 which is used in an embodiment of the present invention. FIG. 1 shows a schematic arrangement of the photographic processor 10 as viewed from the top side of the photographic processor 10. FIGS. 2A and 2B schematically illustrate the interior of the photographic processor 10 as viewed along the line 2A—2A and the line 2B—2B of FIG. 1, respectively.

The photographic processor 10 comprises a film processor 14 for subjecting a negative film 12 serving as a photographic film to development, fixing, washing, and dry processing; a photographic printing paper processor 18 for subjecting a photographic printing paper 16, i.e., a photosensitive material, to development, fixing, washing, and dry processing; and an exposure device 20 for consecutively exposing images recorded on the negative film 12 processed by the film processor 14 onto the printing paper 16. The film processor 14, the photographic printing paper processor 18, and the exposure device 20 are integrally accommodated in a casing 10A whose interior is shielded from light.

The film processor 14 is provided with a magazine loading section 24 in which magazines 22 are loaded, the negative film 12 imagewise exposed by an unillustrated camera or the like being accommodated in each magazine 22. The negative film 12 is drawn out from the magazine 22 loaded in the magazine loading section 24, and is fed into the film processor 14. Incidentally, images 12B (standard size), 12C (H size), and 12D (panoramic size) having different aspect ratios are recorded on the negative film 12, as shown in FIG. 6A.

As shown in FIG. 2A, a developing tank 26 in which a developing solution is accommodated, a bleach-fixing tank 28 in which a bleach-fixing solution is accommodated, a washing tank 30 in which washing water is accommodated, and a drying section 32 for drying the washed negative film 12 are provided in the film processor 14. The negative film 12 drawn out from the magazine 22 is transported consecutively in the developing tank 26, the fixing tank 28, and the washing tank 30 at a predetermined transporting speed $V_{ND}$ (in the direction of arrow A shown in FIGS. 1 and 2A). so as to be subjected to development, fixing, and washing. The negative film 12 is then transported to the drying section 32 so as to be subjected to dry processing.

As shown in FIG. 2B, a developing tank 34, a fixing tank 36, and a washing tank 38, in which a developing solution, a fixing solution, and washing water for processing the printing paper 16 are respectively accommodated, are provided in the photographic printing paper processor 18. In addition, a drying section 40 for drying the printing paper 16 for which wash processing has been completed and a receiving box 42 for stocking the printing papers 16 for which dry processing has been completed are also provided in the photographic printing paper processor 18.

After the images recorded on the negative film 12 are exposed on the printing paper 16, the printing paper 16 is transported consecutively in the developing tank 34, the fixing tank 36, and the washing tank 38 at a predetermined transporting speed $V_{PD}$ (in the direction of arrow B shown in FIGS. 1 and 2B). Thus, the printing paper 16 is immersed in the developing solution, the fixing solution, and the washing water so as to be subjected to development, fixing, and wash processing. Further, upon completion of wash processing, the printing paper 16 is subjected to dry processing in the drying section 40, and is discharged to the receiving box 42. The printing paper 16 discharged to the receiving box 42 is cut for each image frame, and is thereby produced as a photographic print.

Meanwhile, as shown in FIG. 2, the negative film 12 processed in the film processor 14 is transported to the exposure device 20, and is discharged outside the machine via this exposure device 20. A paper magazine 44 in which unexposed printing paper 16 wound in the form of a roll is accommodated is loaded in the exposure device 20. The unexposed printing paper 16 is drawn out beginning with the peripheral end of the roll, is fed into the exposure device 20, and is transported to the photographic printing paper processor 18 via the exposure device 20.

Figure 3:
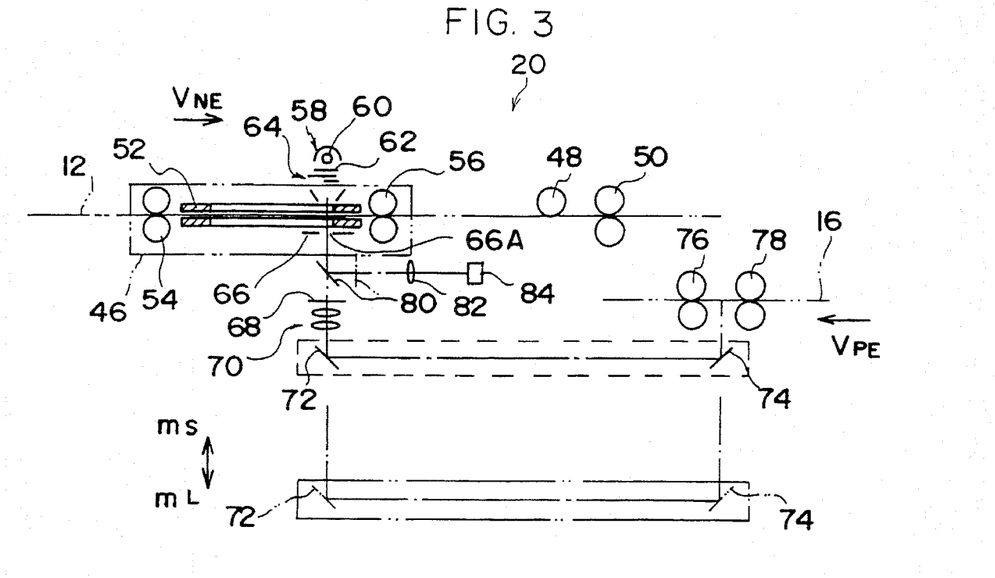
FIG. 3 is a schematic diagram of an exposure device used in this embodiment.

FIG. 3 shows a schematic arrangement of the exposure device 20 provided in the photographic processor 10. In this exposure device 20, a negative carrier 46, a tension roller 48, and a pair of transport rollers 50 are arranged along the traveling direction of the negative film 12. A negative mask 52 for supporting the negative film 12 by masking peripheral portions of the image frame of the negative film 12, as well as pairs of transport rollers 54, 56 for holding the negative film 12 by nipping it on both sides of the negative mask 52 in the traveling direction of the negative film 12 and for transporting the negative film 12 by being rotatively driven, are disposed in the negative carrier 46.

The negative film 12 which is transported to the exposure device 20 from the film processor 14 is fed into the negative carrier 46, and the transport thereof is temporarily stopped at a position where the image frame portion is placed in an opening in the negative mask 52, and exposure processing is carried out. Upon completion of exposure processing, the negative film 12 is fed into a nip between the pair of transport rollers 50, and an ensuing image frame portion is placed within the negative mask 52, to effect exposure processing.

A light source unit 58 is provided above the negative carrier 46. This light source unit 58 has a light source 60, a heat shielding filter 62, and a color color adjusting filter 64. The light emitted from the light source 60 is transmitted through the heat shielding filter 62 and the color adjusting filter 64, and is applied to the image frame portion of the negative film 12 through the opening in the negative mask 52. In addition, a slit mask 66 in which a slit 66A for exposure is formed is provided below the negative carrier 46, and part of the light which is transmitted through the negative film 12 passes through the slit 66A. Incidentally, the slit 66A is formed with a small width and extends in a direction perpendicular to the traveling direction of the negative film 12 (i.e., in a direction perpendicular to the plane of the drawing of FIG. 3).

A shutter 68, a printing lens 70, and a pair of reflecting mirrors 72 and 74 are provided on the side of the slit masks 66 which is away from the negative carrier 52. The light which has passed through the slit 66A in the slit mask 66 is transmitted through the printing lens 70, is reflected by the reflecting mirrors 72 and 74, and reaches an exposing position between two pairs of transport rollers 76 and 78, thereby forming an image corresponding to the image light transmitted through the slit hole 66A.

The transport rollers 76 and 78 nip and transport the printing paper 16 drawn out from the paper magazine 44 (see FIG. 2B). While the printing paper 16 is being exposed by the image light transmitted through the slit hole 66A, the printing paper 16 is transported by the pair of transport rollers 76 and 78 (slit exposure). The printing paper 16 provided with slit exposure is transported from the exposure device 20, and is fed into the photographic printing paper processor 18 so as to be subjected to development processing.

The exposure device 20 is so arranged as to be capable of changing the length of the optical path of the light transmitted through the printing lens 70 and reaching the printing paper 16 by moving the reflecting mirrors 72 and 74, so as to change the size (magnification) of the image formed on the printing paper 16. It should be noted that the printing lens 70 is so adjusted to allow the transmitted light to form an image on the surface of the printing paper 16 at the exposing position.

Meanwhile, a changeover mirror 80 is disposed between the slit mask 86 and the shutter 68 in such a manner as to be capable of projecting. As the changeover mirror 80 projects onto the optical path of the light transmitted through the slit hole 66A, the changeover mirror 80 reflects the light transmitted through the slit hole 66A. The reflected by the changeover mirror 80 is transmitted through a lens 82 for a sensor, and forms an image on a sensor 84. This sensor 84 measures the light transmitted through the negative film 12, i.e., measures the state of an image on the negative film 12. From the result of measurement by this sensor 84, the exposure conditions, including the luminance of the light source 60, adjustment of the light source unit 58 such as the adjustment of the color adjusting filter 64, the magnification for exposure, and the traveling speeds of the negative film 12 and the printing paper 16, are determined by an exposure controlling circuit which will be described below.

Figure 4:
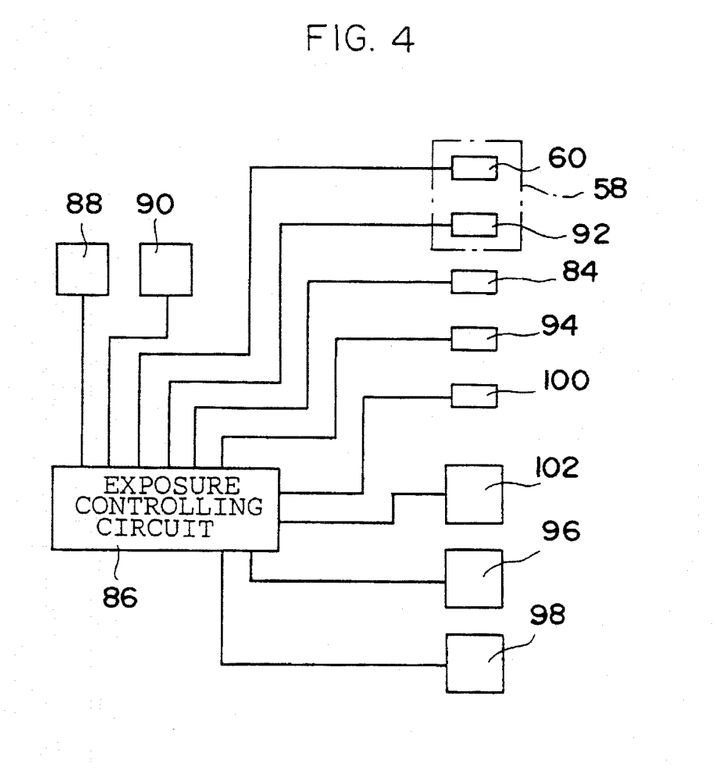
FIG. 4 is a block diagram illustrating a schematic configuration of the exposure device used in this embodiment.

As shown in FIG. 4, the exposure device 20 is provided with an exposure controlling circuit 86. Connected to the exposure controlling circuit 86 are a negative-carrier moving motor 88 for moving the negative carrier 46, a film transporting motor 90 for driving the pair of transport rollers 50 and the pairs of transport rollers 54 and 56 in the negative carrier 46, the light source 60, a color-adjustment-filter driving circuit 92, a changeover-mirror driving motor 94, the sensor 84, a reflecting-mirror driving motor 96, a printing-paper transporting motor 98 for driving the pairs of transport rollers 76 and 78 for transporting the printing paper 16, a shutter driving motor 100 for driving the shutter 68, a printing-lens driving circuit 102 for driving the printing lens 70, and so on. The respective component parts within the exposure device 20 are controlled by the exposure controlling circuit 86.

In the exposure controlling circuit 86, when the negative film 12 is fed in from the film processor 14 at the transporting speed $V_{ND}$, the pairs of transport rollers 54 and 56 nip and transport the negative film 12 within the negative carrier 46. When the negative film 12 is transported to the exposing position where the image frame is placed in the opening in the negative mask 52, the transport is stopped. Upon completion of the exposure of the negative film 12, the pairs of transport rollers 54 and 56 together with the pair of transport rollers 50 transport the negative film, and an ensuing image frame is placed in the exposing position.

When the negative film 12 is stopped at the exposing position, adjustment is provided such that the reflecting mirrors 72 and 74 and the printing prism 70 are driven in accordance with the magnification m for exposure, so that the image recorded on the negative film 12 is formed on the printing paper 16 placed at the exposing position between the pairs of transport rollers 76 and 78. Subsequently, the negative carrier 46 is moved so that the negative film 12 and the printing paper 16 are respectively transported at the transporting speeds $V_{NE}$ and $V_{PE}$ corresponding to a magnification $m_i$. At the same time, in the exposure controlling circuit 86, the light source unit 58 is operated, and the shutter 68 is receded from the optical path, thereby allowing the image recorded on the negative film 12 to be subjected to slit exposure on the printing paper 16.

It should be noted that the transporting speeds $V_{NE}$ and $V_{PE}$ of the negative films 12 and the printing paper 16 are set in advance in accordance with the magnification m. In addition, the transporting speed $V_{NEmax}$ of the negative film 12 is set to a speed higher than at least the transporting speed $V_{ND}$ of the negative film 12 within the film processor 14. On the other hand, the transporting speed $V_{PEmax}$ of the printing paper 16 is set to a speed higher than at least the transporting speed $V_{PD}$ of the printing paper within the printing paper processor 18.

Figure 5:
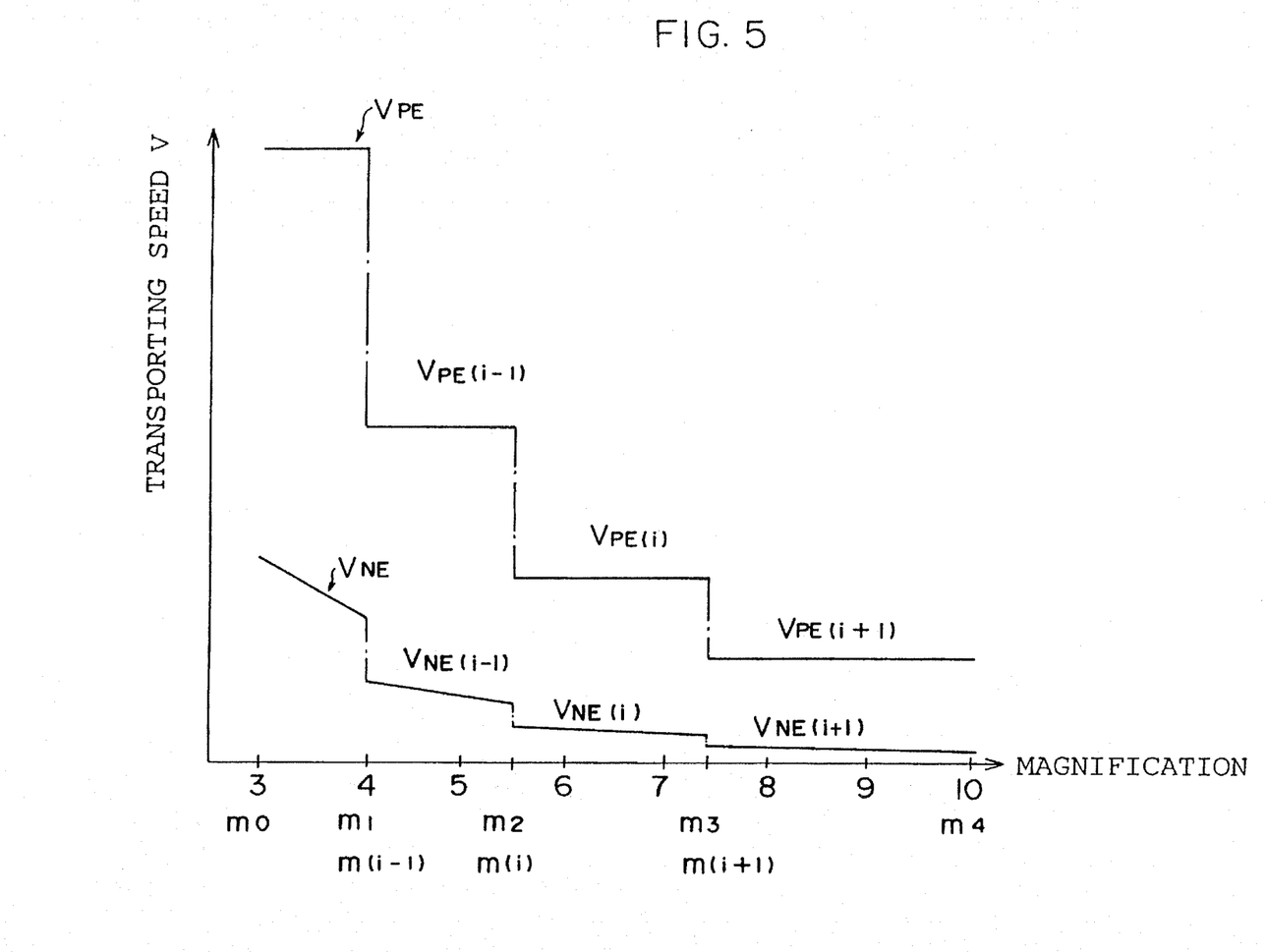
FIG. 5 is a graph illustrating an example of the relationship between the traveling speed of the negative film and the traveling speed of the photographic printing paper on the one hand, and the magnification for exposure on the other.

FIG. 5 shows the relationship between, on the one hand, the traveling speed $V_{NE}$ of the negative film 12 and the traveling speed $V_{PE}$ of the photographic printing paper 16 in the exposure device 20 and, on the other hand, the magnification m of the image to be exposed on the printing paper 16. In the exposure device 20 of this embodiment, a minimum magnification is set to 3-fold, and a maximum magnification is set to 10-fold the transporting speeds $V_{NE}$ and $V_{PE}$ are set between them in four stages, respectively, and the respective transporting speeds $V_{NE}$ and $V_{PE}$ are changed at points of magnification (boundary magnification) $m_{(i)}$.

This boundary magnification $m_{(i)}$ with respect to its immediately preceding and following boundary magnifications $m_{(i-1)}$ and $m_{(i+1)}$ is set such that $$m_{(i)} = (m_{(i-1)} \times m_{(i+1)})^{1/2}$$

In addition, in the magnification $m_{(i)}$ (i is an integer from 0 to n, and n is the number of a stage for changing over the transporting speed $V_{PE}$) at a point for changing the magnification m, as for the transporting speed $V_{PE}$, the transporting speed $V_{PE(i)}$ on the boundary magnification $m_{(i+1)}$ side with respect to the transporting speed $V_{PE(i-1)}$ on the boundary magnification $m_{(i-1)}$ side is set as $$V_{PE(i)} = (\alpha \times V_{PE(i-1)})/m_{(i)}^2$$

where $\alpha$ is a predetermined constant.

Furthermore, the transporting speed $V_{NE}$ of the negative film 12 is varied in accordance with the magnification m, and at a point of boundary magnification $m_{(i)}$, the transporting speed $V_{NE(i)}$ on the boundary magnification $m_{(i+1)}$ side with respect to the transporting speed $V_{NE(i-1)}$ on the boundary magnification $m_{(i-1)}$ side is set as $$V_{NE(i)} = (\beta \times V_{NE(i-1)})/m_{(i)}^3$$

where $\beta$ is a predetermined constant.

In the exposure controlling circuit 86, the transporting speeds $V_{NE}$ and $V_{PE}$ which are thus set are selected in accordance with the magnification m for exposure, and the printing paper 16 is exposed in accordance with the images recorded on the negative film 12 while the negative film 12 and the printing paper 16 are being transported. Consequently, images 16B (standard size), 16C (H size), and 16D (panoramic size) corresponding to the respective aspect ratios of the images recorded on the negative film 12 are recorded, as shown in FIG. 6B.

Next, a description will be given of the operation of this embodiment. In he photographic processor 10 used in this embodiment, after the magazine 22 in which exposed negative film 12 is accommodated is loaded in the magazine loading section 24, the negative film 12 is pulled out from the magazine 22, and is transported to the film processor 14. In the film processor 14, while the negative film 12 is being transported at the transporting speed $V_{ND}$, the negative film 12 is subjected to development, fixing, and wash processing. The negative film 12 is then subjected to dry processing, and is transported to the exposure device 20. In the exposure device 20, while the unexposed printing paper 16 is being pulled out from the magazine 44, the image recorded on the negative film 12 is slit-exposed on the printing paper 16, and the printing paper 16 is then transported to the photographic printing paper processor 18.

In the photographic printing paper processor 18, while the imagewise exposed printing paper 16 is being transported at the transporting speed $V_{pD}$, the printing paper 16 is subjected to development, fixing, and wash processing, is then subjected to dry processing, and is discharged to the receiving box 42. The printing paper 16 discharged to the receiving box 42 is cut for each image frame as photographic prints, for instance.

Here, a description will be given of slit exposure in the exposure device 20.

In the exposure device 20, when the negative film 12 processed in the film processor 14 is fed in, the image frame portion of the negative film 12 is held in correspondence with the negative mask 52 of the negative carrier 46. Subsequently, the changeover mirror is positioned in the light path, and the image recorded on the negative film 12 is read by the sensor 84 so as to determine the exposure conditions. At this time, the magnification m for exposure is also read from the image recorded on the negative film 12.

In the exposure controlling circuit 86, the exposure conditions are set on the basis of the result of detection by the sensor 84. At this time, the moving speed of the negative carrier 46, i.e., both the transporting speed $V_{NE}$ of the negative film 12 and the transporting speed $V_{PE}$ of the printing paper 16, are set in accordance with the magnification m for exposure.

In the exposure device 20, while the negative film 12 is being transported, the light emitted from the light source unit 58 and transmitted through the negative film 12 and the slit hole 66A in the slit mask 66 is made to form an image on the printing paper 16 being transported under the exposure conditions thus set, thereby effecting slit exposure.

Here, in the exposure device 20, the printing paper 16 is moved when slit exposure is carried out. This moving speed, i.e., the transporting speed $V_{PE}$ of the printing paper 16, is varied in accordance with the magnification m. For this reason, there are cases where the illuminance on the exposure surface of the printing paper 16 varies when the magnification m is changed. Hence, there are cases where it is impossible to record an image properly.

If it is assumed that the illuminance on the negative film 12 from the light source unit 58 is L, and that the preset constant is $\alpha$, the amount of exposure Q can be expressed by the following Formula (1):

$$Q = \frac{\alpha \cdot L}{m^2 \cdot V_{PE}} \qquad (1)$$

Meanwhile, if an attempt is made to vary the transporting speed $V_{PE}$ of the printing paper 16 in stages, with respect to the boundary magnification $m_{(i)}$ serving as a boundary for varying the transporting speed $V_{PE}$, the transporting speed on the boundary magnification $m_{(i-1)}$ side is set as $V_{PE(i-1)}$, and the transporting speed on the boundary magnification $m_{(i+1)}$ is set as $V_{PE(i)}$. Here, since the amount of exposure Q at an illuminance $L_{min}$ at the time of a low magnification at each of transporting speed $V_{PE(i-1)}$ and $V_{PE(i)}$ and the amount of exposure Q at an illuminance $L_{max}$ at the time of a high magnification at $V_{PE(i+1)}$ are equal, it is possible to obtain the following Formulae (2) and (3) from Formula (1):

$$\frac{\alpha \cdot L}{m_{(i-1)}^2 \cdot V_{PE(i-1)}} = \frac{\alpha \cdot L}{m_{(i)}^2 \cdot V_{PE(i)}}$$

Accordingly, $$\frac{V_{PE(i-1)}}{V_{PE(i)}} = \frac{m_{(i)}^2}{m_{(i-1)}^2} \qquad (2)$$

In addition, $$\frac{\alpha \cdot L}{m_{(i)}^2 \cdot V_{PE(i-1)}} = \frac{\alpha \cdot L}{m_{(i+1)}^2 \cdot V_{PE(i)}}$$

Accordingly, $$\frac{V_{PE(i-1)}}{V_{PE(i)}} = \frac{m_{(i+1)}^2}{m_{(i)}^2} \qquad (3)$$

From Formulae (2) and (3) above, the following formula holds:

$$m_{(i)} = (m_{(i-1)} \times m_{(i+1)})^{1/2} \qquad (4)$$

From this formula, if the interval between the minimum magnification $m_s$ and the maximum magnification $m_L$ is divided into, for example, four stages, the respective boundary magnifications $m_0 - m_4$ can be expressed as follows (see FIG. 5)

$$m_o = m_s = 3$$

$$m_1 = (m_s^3 \cdot m_L)^{1/4} \geqq 4.05$$

$$m_2 = (m_s \cdot m_L)^{1/2} \geqq 5.48$$

$$m_3 = (m_s \cdot m_L^3)^{3/4} \geqq 7.4$$

$$m_4 = m_L = 10$$

Furthermore, since the amount of exposure Q is fixed irrespective of the magnification m, if it is assumed that a constant portion is β, from Formula (1) we have $V_{PE} = \beta/m^2$. Meanwhile, since $V_{PE} = m \cdot V_{NE}$, the transporting speed $V_{NE}$ of the negative film 12 with respect to the transporting speed $V_{PE}$ of the printing paper 16 is expressed as $$V_{NE} = V_{PE}/m = \beta/m^3 \qquad (5)$$

Accordingly, the transporting speed $V_{NE}$ of the negative film 12 can be set to a speed obtained by dividing the transporting speed $V_{PE}$ of the printing paper 16 by the magnification m (see FIG. 5). In addition, the transporting speed of the negative film 12 can be set in inverse proportion to the cube of the magnification m.

Thus, as the transporting speed of the negative film 12 and the transporting speed of the printing paper 16 are set in advance, and the transporting speed $V_{NE}$ of the negative film 12 and the transporting speed $V_{PE}$ of the printing paper 16 are changed over in accordance with the magnification m at the time of exposure, it is possible to secure a fixed illuminance irrespective of the magnification m for exposure when the image recorded on the negative film 12 is exposed on the printing paper 16. Hence, it is possible to simply prevent an over- or under-exposure which is likely to occur during slit exposure. Since the printing paper 16 can be exposed with a fixed amount of exposure, the quality of the photographic prints which are finished by the photographic processor 10 is not undermined.

Although, in this embodiment, the arrangement provided is such that the transporting speed $V_{PE}$ of the printing paper 16 is varied in stages, and the transporting speed $V_{NE}$ of the negative film 12 is further varied in accordance with the magnification m for exposure, a setting may be provided such that the transporting speed $V_{NE}$ of the negative film 12 is varied in stages, and the transporting speed $V_{PE}$ of the printing paper 16 is varied in accordance with the transporting speed $V_{NE}$ of the negative film 12 and the magnification m for exposure. Still alternatively, a setting may be provided such that the transporting speed $V_{NE}$ of the negative film 12 and the transporting speed $V_{PE}$ of the printing paper 16 are respectively varied in accordance with the magnification m for exposure.

Meanwhile, although the transporting speed $V_{ND}$ of the negative film 12 in the film processor 14 is fixed, if the transporting speed $V_{PE}$ of the printing paper 16 in the exposure device 20 is assumed to be fixed, the transporting speed $V_{NE}$ of the negative film 12 in the exposure device 20 changes with the magnification m for exposure. In addition, if an operation of returning the image portion of the negative film 12 to the exposure-starting position is to be effected after the density or the like of the image recorded on the negative film 12 is read by the sensor 84, then the negative films 12 are accumulated on the upstream side of the exposure device 20.

What is most desirable at this time is that the average transporting speed of the negative film 12 in the exposure device 20 is equal to or slightly slower than the transporting speed $V_{ND}$. However, since the average transporting speed of the negative film 12 in the exposure device 20 is substantially affected by the sizes of the images recorded on the negative film 12, it is virtually difficult to fix the average transporting speed of the negative film 12 in the exposure device 20. Therefore, the maximum transporting speed $V_{NEmax}$ of the negative film 12 in the exposure device 20 is set to be greater than or equal to the transporting speed $V_{ND}$ in the film processor 14. Consequently, when the negative film 12 is being transported at least at this maximum transporting speed $V_{NEmax}$, it is possible to prevent the negative films 12 from accumulating in an upstream portion of the exposure device 20 irrespective of the sizes of the images recorded on the negative film 12. Furthermore, if, for example, the transporting speed $V_{NE}$ of the negative film 12 during nonexposure is made faster than the transporting speed $V_{ND}$, the average transporting speed of the negative film 12 in the exposure device 20 can be made close to the transporting speed $V_{ND}$, so that speedier processing of the negative film 12 becomes possible.

Although the transporting speed $V_{PD}$ of the printing paper 16 in the photographic printing paper processor 18 is fixed, if the transporting speed $V_{NE}$ of the negative film 12 during exposure is assumed to be fixed, the transporting speed $V_{PE}$ changes in accordance with the magnification m for exposure. In addition, in order to set the magnification m for exposure and the exposure conditions, the transport of the printing paper 16 is substantially stopped ($V_{PE} \cong 0$) while the negative film 12 is being transported or when an image not requiring exposure is present in the negative film 12.

What is most desirable between the exposure device 20 and the photographic printing paper processor 18 is that the average transporting speed of the printing paper 16 in the exposure device 20 is equal to or slightly faster than the transporting speed $V_{PD}$. If the average transporting speed becomes slower, the printing paper 16 tends to be pulled, and it is difficult to fix the average transporting speed of the printing paper 16 in the exposure device 20 in the same way as the aforementioned average transporting speed of the negative film 12.

Here, if the maximum transporting speed $V_{PEmax}$ of the printing paper 16 (when the magnification m for exposure is small) is set to be greater than or equal to the transporting speed $V_{PD}$, it is possible to increase the average transporting speed of the printing paper 16 in the exposure device 20. Consequently, it is possible to prevent the printing paper 16 from being pulled by the photographic printing paper processor 18.

Thus, in the case of the negative film 12, the maximum transporting speed $V_{NEmax}$ is set to be less than or equal to the transporting speed $V_{ND}$, while, in the case of the printing paper 16, the maximum transporting speed $V_{PEmax}$ is set to be greater than or equal to the transporting speed $V_{PD}$. Hence, in the photographic processor 10 having the exposure device 20 which effects exposure while moving the negative film 12 and the printing paper 16, respectively, the processing of the negative film 12 and the printing paper 16, as well as the process from the development processing of the negative film 12 to the development processing of the printing paper 16, can be effected speedily.

It should be noted that the photographic processor 10 used in this embodiment does not limit the arrangement of the photographic processor to which the present invention is applied. Namely, the first and second processing apparatuses are not confined to the film processor 14 and the photographic printing paper processor 18 of this embodiment, and arrangements which are generally used for processing the negative films 12 and the photographic printing papers 16 may be applied. In addition, the photographic film is not limited to the negative type, and may be the positive type, and steps for processing the respective photographic films and photosensitive materials may be applied.

In addition, the exposure device is not confined to the exposure device 20 of this embodiment, and it is possible to use exposure devices which expose images recorded on a photographic film onto a photosensitive material while transporting both the photographic film with images recorded thereon and the unexposed photosensitive material at respectively set speeds. For example, it is possible to use digital exposure devices in which an image recorded on a photographic film is read, the image is converted into an electrical signal such as a digital signal, and a laser beam modulated in response to the electrical signal is applied to a photosensitive material, so as to effect imagewise exposure. It should be noted that the transporting speed $V_{NE}$ of the photographic film and the transporting speed $V_{PE}$ of the photosensitive material are sufficient if they are set in accordance with the exposure device used.

What is claimed is:

1. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

a second transporting device provided in said exposure device and adapted to transport an unexposed photosensitive material at a predetermined speed; and an exposing optical system provided in said exposure device and adapted to effect exposure by causing the image on the photographic film to be formed on the photosensitive material in a case where the photographic film is being transported by said first transporting device and the photosensitive material is being transported by said second transporting device;

wherein the transporting speed of the photographic film transported by said first transporting device is set such that if the transporting speed of the photosensitive material transported by said second transporting device is fixed, a transporting speed $V_{ND}$ of the photographic film in said first processor and a maximum transporting speed $V_{NEmax}$ of the photographic film transported by said first transporting device satisfy the following formula:

$$V_{ND} \leq V_{NEmax}.$$

2. A photographic processor according to claim 1, wherein said exposing optical system is provided in such a manner as to be capable of varying illuminance on the basis of a magnification.

3. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

a second transporting device provided in said exposure device and adapted to transport an unexposed photosensitive material at a predetermined speed; and an exposing optical system provided in said exposure device and adapted to effect exposure by causing the image on the photographic film to be formed on the photosensitive material in a case where the photographic film is being transported by said first transporting device and the photosensitive material is being transported by said second transporting device;

wherein the transporting speed of the photosensitive material transported by said second transporting device is set such that if the transporting speed of the photographic film transported by said first transporting device is fixed, a transporting speed $V_{PD}$ of the photosensitive material in said second processor and a maximum transporting speed $V_{PEmax}$ of the photosensitive material transported by said second transporting device satisfy the following formula:

$$V_{PD} \leq V_{PEmax}.$$

4. A photographic processor according to claim 3, wherein said exposing optical system is provided in such a manner as to be capable of varying illuminance on the basis of the magnification.

5. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

a second transporting device provided in said exposure device and adapted to transport an unexposed photosensitive material at a predetermined speed; and an exposing optical system provided in said exposure device and adapted to effect exposure by causing the image on the photographic film to be formed on the photosensitive material in a case where the photographic film is being transported by said first transporting device and the photosensitive material is being transported by said second transporting device;

wherein transporting speed is changed in a plurality of steps corresponding to a plurality of magnifications and said first transporting device and said second transporting device are set such that the magnification $m_i$ at which the transporting speed of the photographic film transported by said first transporting device and the transporting speed of the photosensitive material transported by said second transporting device are changed satisfies the following formula:

$$m_{(i)} = (m_{(i-1)} \times m_{(i+1)})^{1/2},$$

wherein $m_{(i-1)}$ is the immediately preceding magnification at which transporting speed is changed and $m_{(i+1)}$ is the following magnification at which transporting speed is changed.

6. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

a second transporting device provided in said exposure device and adapted to transport an unexposed photosensitive material at a predetermined speed; and an exposing optical system provided in said exposure device and adapted to effect exposure by causing the image on the photographic film to be formed on the photosensitive material in a case where the photographic film is being transported by said first transporting device and the photosensitive material is being transported by said second transporting device;

wherein said first transporting device is set in such a manner as to be capable of varying the transporting speed of the photographic film in inverse proportion to the cube of a magnification of the image on the photosensitive material with respect to the image on the photographic film.

7. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

a second transporting device provided in said exposure device and adapted to transport an unexposed photosensitive material at a predetermined speed; and an exposing optical system provided in said exposure device and adapted to effect exposure by causing the image on the photographic film to be formed on the photosensitive material in a case where the photographic film is being transported by said first transporting device and the photosensitive material is being transported by said second transporting device;

wherein said second transporting device is set in such a manner as to be capable of varying the transporting speed of the photosensitive material in inverse proportion to the square of a magnification of the image on the photosensitive material with respect to the image on the photographic film.

8. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

an exposing optical system provided in said exposure device and adapted to effect exposure by causing the image on the photographic film to be formed on the photosensitive material in a case where the photographic film is being transported by said first transporting device and the photosensitive material is being transported by said second transporting device;

a measuring device provided in said exposure device so as to measure a state of the image on the photographic film; and a controlling device for determining a magnification of the image on the photosensitive material with respect to the image on the photographic film on the basis of data on the state of the image measured by said measuring device and for controlling said first transporting device, said second transporting device, and said exposing optical system;

wherein if the transporting speed of the photosensitive material transported by said second transporting device is fixed, said first transporting device varies the transporting speed of the photographic film transported by said first transporting device on the basis of the magnification and varies illuminance by said exposing optical system on the basis of the magnification, and said first transporting device is set such that a transporting speed $V_{ND}$ of the photographic film in said first processor and a maximum transporting speed $V_{NEmax}$ of the photographic film transported by said first transporting device satisfy the following formula:

$$V_{ND} \leq V_{NEmax}.$$

9. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

an exposing optical system provided in said exposure device and adapted to effect exposure by causing the image on the photographic film to be formed on the photosensitive material in a case where the photographic film is being transported by said first transporting device and the photosensitive material is being transported by said second transporting device;

a measuring device provided in said exposure device so as to measure a state of the image on the photographic film; and a controlling device for determining a magnification of the image on the photosensitive material with respect to the image on the photographic film on the basis of data on the state of the image measured by said measuring device and for controlling said first transporting device, said second transporting device, and said exposing optical system;

wherein if the transporting speed of the photographic film transported by said first transporting device is fixed, said second transporting device varies the transporting speed of the photosensitive material transported by said second transporting device on the basis of the magnification and varies illuminance by said exposing optical system on the basis of the magnification, and said second transporting device is set such that a transporting speed $V_{PD}$ of the photosensitive material in said second processor and a maximum transporting speed $V_{PEmax}$ of the photosensitive material transported by said second transporting device satisfy the following formula:

$$V_{PD} \leq V_{PEmax}.$$

10. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

an exposing optical system provided in said exposure device and adapted to effect exposure by causing the image on the photographic film to be formed on the photosensitive material in a case where the photographic film is being transported by said first transporting device and the photosensitive material is being transported by said second transporting device;

a measuring device provided in said exposure device so as to measure a state of the image on the photographic film; and a controlling device for determining a magnification of the image on the photosensitive material with respect to the image on the photographic film on the basis of data on the state of the image measured by said measuring device and for controlling said first transporting device, said second transporting device, and said exposing optical system;

wherein transporting speed is changed in a plurality of steps corresponding to a plurality of magnifications and said first transporting device and said second transporting device are set such that the magnification $m_i$ at which the transporting speed of the photographic film transported by said first transporting device and the transporting speed of the photosensitive material transported by said second transporting device are changed satisfies the following formula:

$$m_{(i)} = (m_{(i-1)} \times m_{(i+1)})^{1/2},$$

wherein $m_{(i-1)}$ is the immediately preceding magnification at which transporting speed is changed and $m_{(i+1)}$ is the following magnification at which transporting speed is changed.

11. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

an exposing optical system provided in said exposure device and adapted to effect exposure by causing the image on the photographic film to be formed on the photosensitive material in a case where the photographic film is being transported by said first transporting device and the photosensitive material is being transported by said second transporting device;

a measuring device provided in said exposure device so as to measure a state of the image on the photographic film; and a controlling device for determining a magnification of the image on the photosensitive material with respect to the image on the photographic film on the basis of data on the state of the image measured by said measuring device and for controlling said first transporting device, said second transporting device, and said exposing optical system;

wherein said first transporting device is set in such a manner as to be capable of varying the transporting speed of the photographic film in inverse proportion to the cube of the magnification.

12. A photographic processor in which a first processor for subjecting a photographic film to development processing while transporting the photographic film, an exposure device for subjecting a photosensitive material to exposure processing with an image recorded on the photographic film processed by the first processor, and a second processor for subjecting the photosensitive material, which has been subjected to exposure processing, to development processing while transporting the photosensitive material are accommodated integrally, said photographic processor comprising:

a first transporting device provided in said exposure device and adapted to transport the photographic film subjected to development processing by said first processor at a predetermined speed;

an exposing optical system provided in said exposure device and adapted to effect exposure by causing the image on the photographic film to be formed on the photosensitive material in a case where the photographic film is being transported by said first transporting device and the photosensitive material is being transported by said second transporting device;

a measuring device provided in said exposure device so as to measure a state of the image on the photographic film; and a controlling device for determining a magnification of the image on the photosensitive material with respect to the image on the photographic film on the basis of data on the state of the image measured by said measuring device and for controlling said first transporting device, said second transporting device, and said exposing optical system;

wherein said second transporting device is set in such a manner as to be capable of varying the transporting speed of the photosensitive material in inverse proportion to the square of the magnification.

* * * * *